Aug. 12, 1930.  H. SCHLAICH  1,772,568
INDICATING MECHANISM
Filed Oct. 18, 1926  2 Sheets-Sheet 1
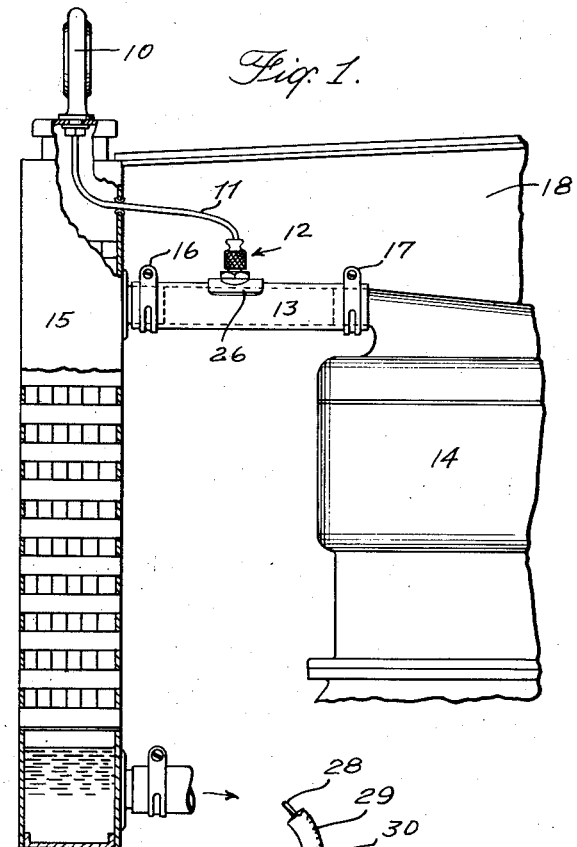
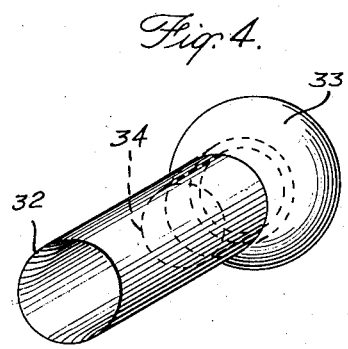
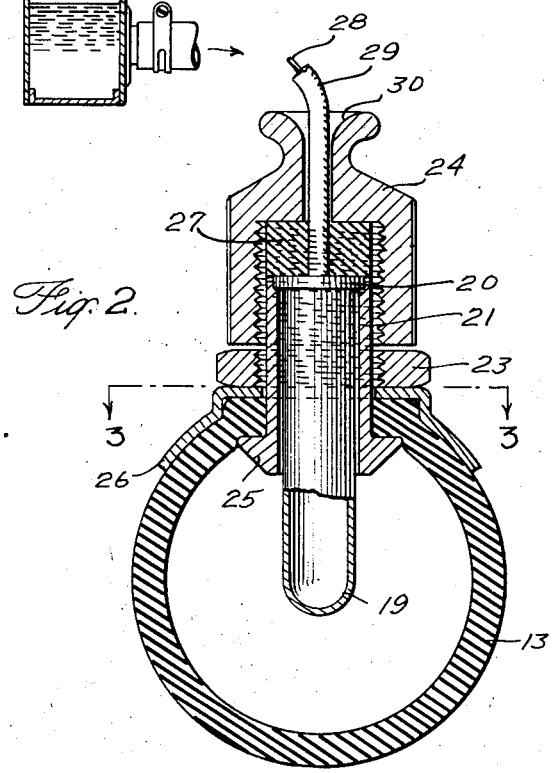
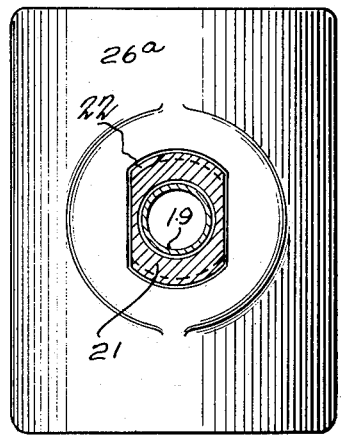
INVENTOR
HERMAN SCHLAICH
BY
ATTORNEYS Aug. 12, 1930.   H. SCHLAICH   1,772,568
INDICATING MECHANISM
Filed Oct. 18, 1926   2 Sheets-Sheet 2

INVENTOR
HERMAN SCHLAICH
BY Moses & Nolte
ATTORNEYS

Patented Aug. 12, 1930

1,772,568

UNITED STATES PATENT OFFICE

HERMAN SCHLAICH, OF LONG ISLAND CITY, NEW YORK

INDICATING MECHANISM

Application filed October 18, 1926. Serial No. 142,291.

This invention relates to the mounting of temperature responsive elements used in conjunction with distance temperature indicators particularly as applied to automobiles.

In my pending application, Serial No. 667,708 for mounting for temperature responsive elements, filed October 10, 1923, I have disclosed a warning instrument for motor vehicles comprising a temperature responsive element mounted in the flexible hose that carries the cooling medium from the water jackets to the radiator.

The present invention is in the nature of an improvement upon the above mentioned device and has for its principal object to increase the security with which the temperature responsive element is clamped to the hose and to reduce wearing of the hose in use so that liability of leakage due to such mounting of the element is avoided.

To this end, in accordance with one important feature of the invention provision is made of a mounting sleeve for the temperature responsive element insertable through an opening in the hose from the interior of the hose and having a flange of substantial area for engagement with the inner face of the hose. A clamping and steadying plate is located outside the hose and drawn into position to cooperate with the sleeve flange for firmly clamping the hose by means of a nut threaded onto the outwardly protruding portion of said sleeve. The clamping plate is provided with a recess or seat into which the hose material is deformed by the clamping pressure applied to the sleeve flange.

It is a further object of the invention to safeguard the armored capillary tubing that connects the temperature responsive element with the indicator, against sharp bending and against damaging vibration adjacent the connection of said tubing to the temperature responsive element.

For this purpose provision is made in one embodiment of a soft rubber plug surrounding the capillary tubing and of a bonnet enclosing said plug which may be threaded onto the stem of the mounting sleeve to compress the plug and cause it to support the capillary tubing. The bonnet itself may be provided with a smooth surfaced flared mouth, the sides of which limit bending of the capillary tubing where it emerges from the bonnet. The rubber plug also serves as a packing for preventing leakage between the temperature responsive element and the mounting sleeve.

In another embodiment the bending of the capillary tubing is limited by surrounding said tubing adjacent the temperature responsive element with a supporting coil spring.

Another object is to provide a working tool conveniently adapted to prepare the hose coupling of a cooling system for the purpose of mounting the temperature responsive element therein.

Other objects will be apparent from reading this specification in connection with the accompanying drawings, in which:

Fig. 1 is a fragmentary side view of an automobile cooling system embodying my device;

Fig. 2 is a vertical cross section of my device;

Fig. 3 is a cross section taken along the line 3—3 of Fig. 2, looking in the direction of the arrows;

Fig. 4 is a punch especially adapted for doing the necessary cutting in connection with the installation of my device;

Figures 5, 6:
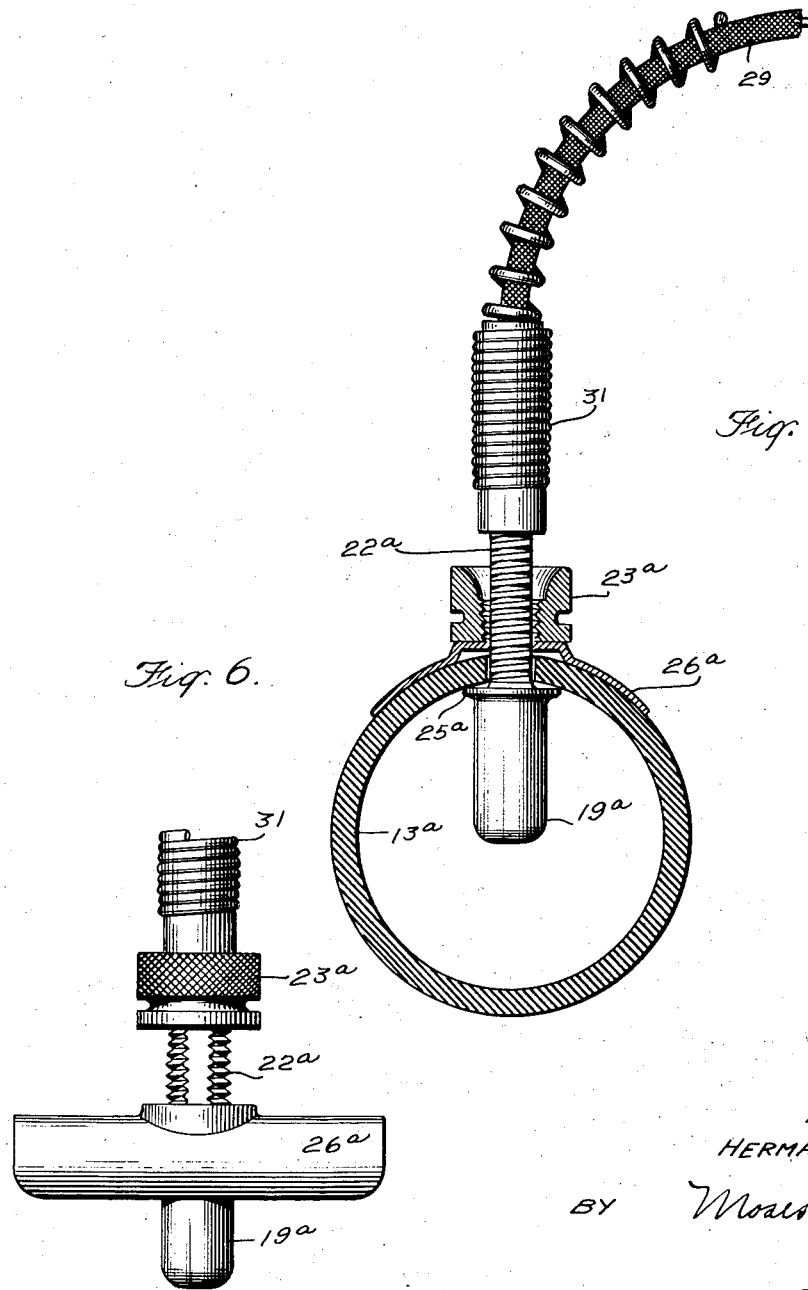
Fig. 5 is a vertical cross section of a modified form of the invention.
Fig. 6 is a detail of the form shown in Fig. 5.

Referring now in detail to the drawings, in which similar characters refer to similar parts throughout, a temperature indicator 10 of the distance type, is operatively connected through a capillary tube 11 with a temperature responsive assembly indicated generally as 12. This temperature responsive assembly is mounted on a hose 13 which conveys the heated cooling medium from the jackets 14 of the engine, where such cooling medium has attained its highest temperature, to the radiator 15 where it is cooled. The hose, or flexible tubular coupling 13, may be secured at its ends to the water system of the engine and to the radiator in any desired manner, as by removable clamps 16 and 17. This portion of the structure is housed in the hood 18 of the vehicle.

The temperature responsive assembly 12 comprises a thermal element 19, represented in the illustrative embodiment of my invention in the form of a temperature fluid containing bulb or chamber. This bulb is provided with an annular flange 20 adapted to seat in an annular recess in a sleeve 21. The sleeve 21 is provided with exterior screw threads 22 which cooperate with the screw threads of a tightening nut 23 and a bonnet 24. The sleeve 21 has an annular flange 25 which lies within the hose 13. The upper face of the flange 25 is preferably flat and provides a broad clamping face for engagement with the inner face of the hose 13. A steadying plate 26 having an opening therein to receive the outwardly projecting portion of the sleeve 21 is clamped firmly against the exterior of the hose by the nut 23. This plate 26 is preferably provided with a flat bottomed recess in that portion of its lower face which overlies the flange 25, but beyond this area it is curved to conform to the contour of the hose 13.

As seen in Fig. 3 the threaded sleeve 21 is flattened on two sides. The opening in the steadying plate 26 for receiving the sleeve is of the same shape. The steadying plate is effective, therefore, to prevent turning of the sleeve 21 when the nut 23 is being threaded onto it.

The tightening of the nut 23 causes the hose material to be deformed into the recess of the steadying plate so that it is very firmly gripped, and the assembly is fixed against shifting or substantial swinging. A tubular plug 27 of resilient material is interposed between the upper side of the flange 20 of the bulb 19, and the inner face of the bonnet 24. The plug 27 acts as a cushioning medium for the bulb 19, and seals the space between the bulb 19 and the sleeve 21. Through this tubular plug a capillary tube 28, with its armor 29 passes, the same being connected at one end to the thermal chamber 19 and at the other end to the temperature indicator 10. The bonnet 24 is provided with a bell mouth 30 to obviate chafing of the armor 29, and to prevent too sharp bending of the capillary tube.

In order to apply the above described temperature responsive assembly to the cooling system of a motor the hose 13 is first disconnected from either the water jacket of the motor or from the radiator, and a round hole is punched in the hose wall. The sleeve 21 is then placed in the hose through an uncoupled end thereof and is thrust outward through the punched hole from within the hose. The steadying plate 26 is then placed upon the outwardly protruding end of the sleeve and drawn down into secure clamping engagement with the hose by threading the nut 23 onto the sleeve 21. During the threading of the nut onto the sleeve 21, the sleeve is held against rotation by the steadying plate 26. The temperature responsive element 19 is next placed in the sleeve 21. The bonnet is then screwed down on the sleeve 21 until the plug 27 is pressed firmly on the rim 20 of the temperature responsive element and on the upper end face of the sleeve 21. The plug 27 is preferably of such size as to permit a space between the bonnet 24 and the nut 23 when the device is assembled, the purpose being to admit of further tightening of the bonnet on the plug when desired.

In the modification shown in Fig. 5, a thermal bulb 19$^a$ having a flanged upper rim 25$^a$ is inserted through the hole in the side of the hose 13$^a$ from the outside without disconnecting the hose from the engine or the radiator. The bulb 19$^a$ is provided with a threaded stem 22$^a$ which is flattened at opposite sides and extends through a hole of the same shape in a steadying plate 26$^a$ outside the hose. The steadying plate 26$^a$ and the flange of the bulb 19$^a$ are drawn into firm clamping engagement with the hose by the tightening of a nut 23$^a$ on the stem 22$^a$. The use of the steadying plate is very advantageous in this construction for the reason that the flange 25$^a$ is necessarily confined in size to a diameter not very much larger than the normal diameter of the hole in the hose. The steadying plate prevents rocking or twisting of the bulb 19$^a$ and stem 22$^a$ when the vehicle is in operation, and therefore greatly reduces wearing of the hose by the flange 25$^a$ and avoids the likelihood of the flange being displaced to a position in which it does not completely cover the hole. In this embodiment the steadying plate is effective by engagement with the flat sides of the stem 22$^a$ to hold the bulb and stem against rotation while the nut 23$^a$ is being tightened. A sleeve 31$^a$ may be threaded upon the end of the threaded shank 22$^a$ and has tightly wrapped upon it a reinforcing spring 31 of sufficient stiffness to protect the capillary tube against sharp bending and excessive oscillation due to vibration of the vehicle.

In order to cut the necessary aperture through the hose 13, a hand punch (see Fig. 4) is provided having the metal cutting tube 32 and the wooden hand piece 33. The hand piece is provided with a wooden shank 34 on which the tube 32 is supported. The cutting tube is driven into the head or body of the hand piece 33 so that it is securely embedded therein. The cutting area of the tube 32 is such as to meet the exact requirements for mounting the thermal responsive element according to my invention. The cutting tool is of very cheap construction and may, therefore, be included in packages containing the parts of this device, and may be thrown away when used. The purchaser, himself, may thus be fully equipped to attach the device, so that the necessity for the employment of skilled labor for such purpose is obviated.

It will be understood that the invention is not confined to the mounting of temperature responsive elements of the particular type herein disclosed, but that features of the invention are applicable as well to the mounting of temperature responsive elements of other types, such as electrical contact devices and others.

While I have illustrated and described in detail certain preferred forms of my invention, it is to be understood that changes may be made therein and the invention embodied in other structures. I do not, therefore, desire to limit myself to the specific constructions illustrated, but intend to cover my invention broadly in whatever form its principle may be utilized.

What I claim is:

1. A temperature indicator adapted to be mounted upon a hose having an aperture in its wall, including a flanged and threaded sleeve adapted to be fitted through said hose aperture from within the hose so that the flange abuts the interior of the hose, a thermal responsive element mounted in said sleeve, a tightening nut in threaded relation with said sleeve adapted to clamp the hose against said flange, a steadying plate between said tightening nut and the outer wall of said hose engaging a large area of the hose, and means connecting the indicating portion of the temperature indicator for operation from the thermal responsive element.

2. A temperature indicator adapted to be mounted upon a hose having an aperture in its wall, including a flanged and threaded sleeve adapted to be fitted through said hose aperture from within the hose so that the flange abuts the interior of the hose, a tightening nut threaded on the protruding portion of the sleeve, and cooperating with the sleeve flange to grip the hose and seal the opening therethrough, a temperature responsive element extending through the sleeve into said hose, means retaining said element in the sleeve, and means connecting the indicating portion of the temperature indicator for operation from the temperature responsive element.

3. A temperature indicator adapted to be mounted upon a hose having a hole in the wall thereof, including a flanged and threaded sleeve inserted through said hole from the interior of the hose, the threaded portion of the sleeve being non-circular in cross section, a steadying plate outside the hose conforming in contour to the hose periphery and having an opening through it shaped to fit the threaded portion of the sleeve, a tightening nut threaded on the sleeve for causing the hose to be clamped between the steadying plate and sleeve flange, a temperature responsive element supported in said sleeve, and means connecting the indicating portion of the temperature indicator for operation from the temperature responsive element.

4. In combination, a temperature responsive element and means for mounting said element in a hose of yielding material so as to be exposed to the contents of the hose, comprising a threaded sleeve having a flange in engagement with the inner face of the hose, a steadying plate engaging and conforming to the contour of the exterior of the hose, a clamping nut threaded on the sleeve for drawing the steadying plate and the sleeve flange into cooperative hose clamping relation, a packing between the element and the threaded sleeve, and a further nut on the sleeve operable to compress such packing.

5. In combination, a temperature indicator, a temperature responsive element, a flexible connection for operating the indicator from the element, means for mounting the temperature responsive element in its operative environment, and a bonnet surrounding the flexible connection adjacent the temperature responsive element, said bonnet being provided with a flared mouth shaped to present a curved convex surface for engagement by the flexible connection when such connection is bent in any direction, for limiting bending of the connection adjacent the element and distributing the bending throughout a substantial length of the connection.

6. The combination with a flexible hose, of an outwardly protruding, hollow member fixed and sealed in a wall of the hose, a temperature responsive element removably mounted in the hollow member, and sealing means for preventing egress of the hose contents between the hollow member and the temperature responsive element mounted therein.

7. In combination, a flexible hose of soft material having an opening therein, a threaded and flanged member having its flanged portion engaging the interior of the hose around said opening and its threaded portion protruding outward through and beyond the opening, a steadying plate conforming generally to the normal contour of the exterior of the hose but presenting a recess over the portion of the hose immediately surrounding the opening, and means threaded on said member for drawing the flanged portion of the member toward the steadying plate and causing the hose material to be deformed and securely clamped in the recess thereof.

8. The combination with a temperature indicator and a hose coupling having an aperture in its wall, of a threaded sleeve fitted through said hose coupling in said aperture, said sleeve having a flange at its lower end in engagement with the inner face of the hose, a temperature responsive element mounted in said sleeve, a curved clamping plate upon said sleeve in engagement with the external face of the hose, and a nut threaded on the external portion of said sleeve for drawing the clamping plate and sleeve flange into firm gripping engagement with the hose, the clamping plate having a recess of the same general contour as the sleeve flange into which the hose material is deformed by the clamping pressure of the nut.

9. The combination with a temperature indicator and a hose coupling having an aperture in its wall, of a threaded sleeve fitted through said hose coupling in said aperture, means cooperating with said sleeve to clamp the hose securely so that no leakage can occur between the hose and the sleeve, a temperature responsive element mounted in said sleeve, and means clamping the temperature responsive element to the sleeve and sealing the space between the sleeve and the temperature responsive element against leakage.

10. The combination with a temperature indicator and a hose having an aperture in its wall, of a threaded sleeve fitted through said hose in said aperture, means cooperating with said sleeve to clamp the hose securely so that no leakage can occur between the hose and the sleeve, a temperature responsive element mounted in said sleeve, and means clamping the temperature responsive element to the sleeve and sealing the space between the sleeve and the temperature responsive element against leakage, comprising a packing plug and a bonnet threaded onto the sleeve for compressing the plug against the sleeve and the temperature responsive element.

In testimony whereof I have affixed my signature to this specification.

HERMAN SCHLAICH.